United States Patent
Hori

(10) Patent No.: US 12,487,784 B2
(45) Date of Patent: Dec. 2, 2025

(54) TERMINAL APPARATUS

(71) Applicant: TOYOTA JIDOSHA KABUSHIKI KAISHA, Toyota (JP)

(72) Inventor: Tatsuro Hori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/530,894

(22) Filed: Dec. 6, 2023

(65) Prior Publication Data

US 2024/0220176 A1 Jul. 4, 2024

(30) Foreign Application Priority Data

Dec. 28, 2022 (JP) ................................. 2022-212662

(51) Int. Cl.
*G06F 3/14* (2006.01)
*H04N 23/611* (2023.01)

(52) U.S. Cl.
CPC ............. *G06F 3/14* (2013.01); *H04N 23/611* (2023.01)

(58) Field of Classification Search
CPC ...... G06F 3/14; H04N 23/611; H04N 13/275; H04N 7/142; H04N 13/296
See application file for complete search history.

(56) References Cited

U.S. PATENT DOCUMENTS

| | | | |
|---|---|---|---|
| 2010/0315413 A1* | 12/2010 | Izadi | G06F 3/0425 345/419 |
| 2014/0133749 A1* | 5/2014 | Kuo | H04N 5/213 382/167 |
| 2017/0019627 A1 | 1/2017 | Wan et al. | |
| 2018/0040156 A1* | 2/2018 | Kondo | G06F 3/0484 |
| 2019/0149807 A1 | 5/2019 | Akao et al. | |
| 2019/0259190 A1* | 8/2019 | Kristal | G06T 11/60 |

FOREIGN PATENT DOCUMENTS

| | | |
|---|---|---|
| JP | 2004-193962 A | 7/2004 |
| JP | 2005-328461 A | 11/2005 |
| JP | 2017-022600 A | 1/2017 |
| WO | 2017195513 A1 | 11/2017 |

* cited by examiner

Primary Examiner — Phung-Hoang J Nguyen
(74) Attorney, Agent, or Firm — Oliff PLC

(57) ABSTRACT

A terminal apparatus includes a display configured to be capable of displaying an image to a user in front, a first imager provided around the display, a plurality of second imagers provided behind the display, a communication interface, and a controller configured to communicate by the communication interface, wherein the controller is configured to transmit, to another terminal apparatus, information for generating a model image representing the user, based on a captured image by a second imager that corresponds to the position of the user included in a captured image by the first imager, so that the other terminal apparatus displays the model image.

4 Claims, 5 Drawing Sheets

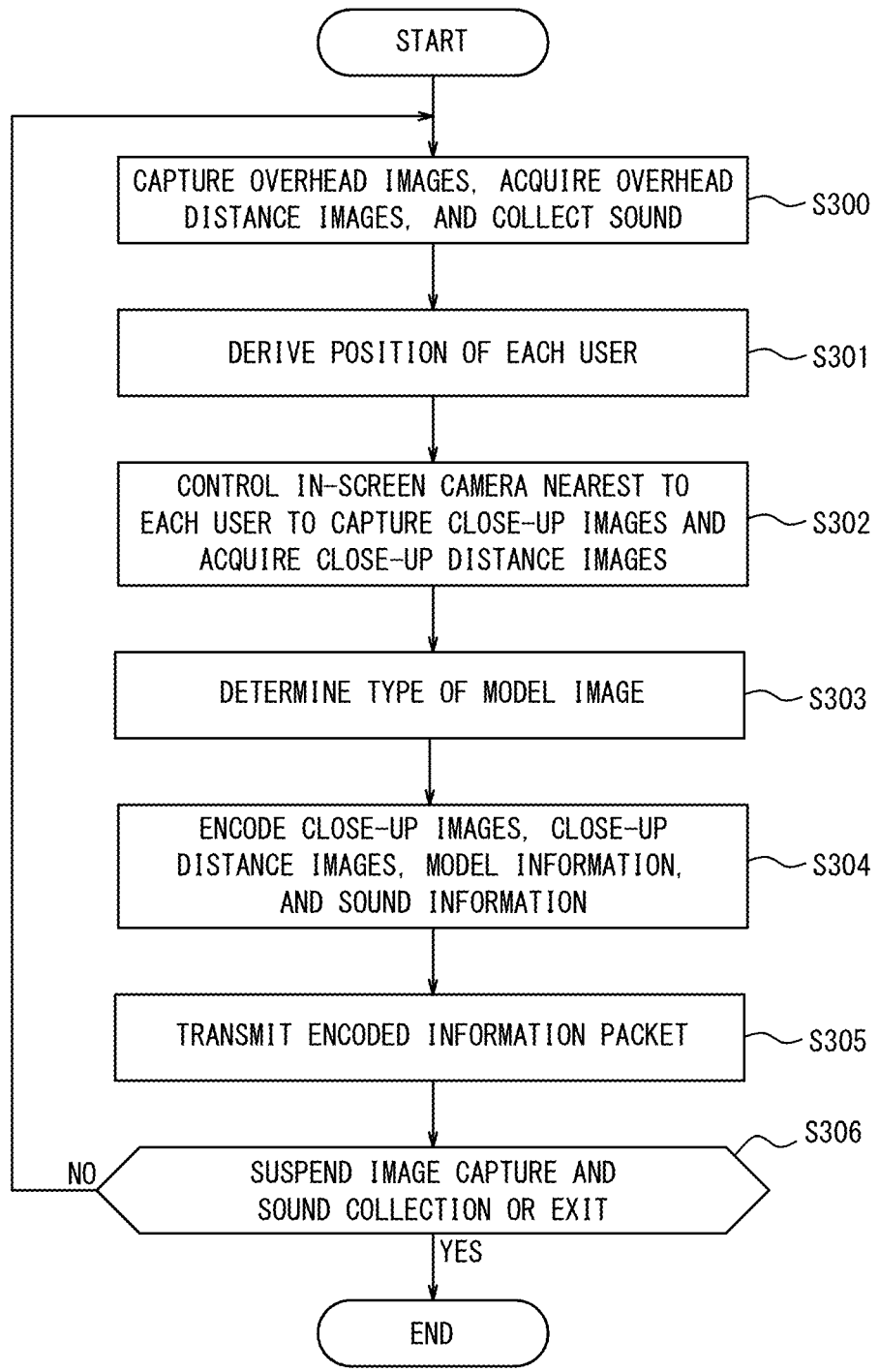

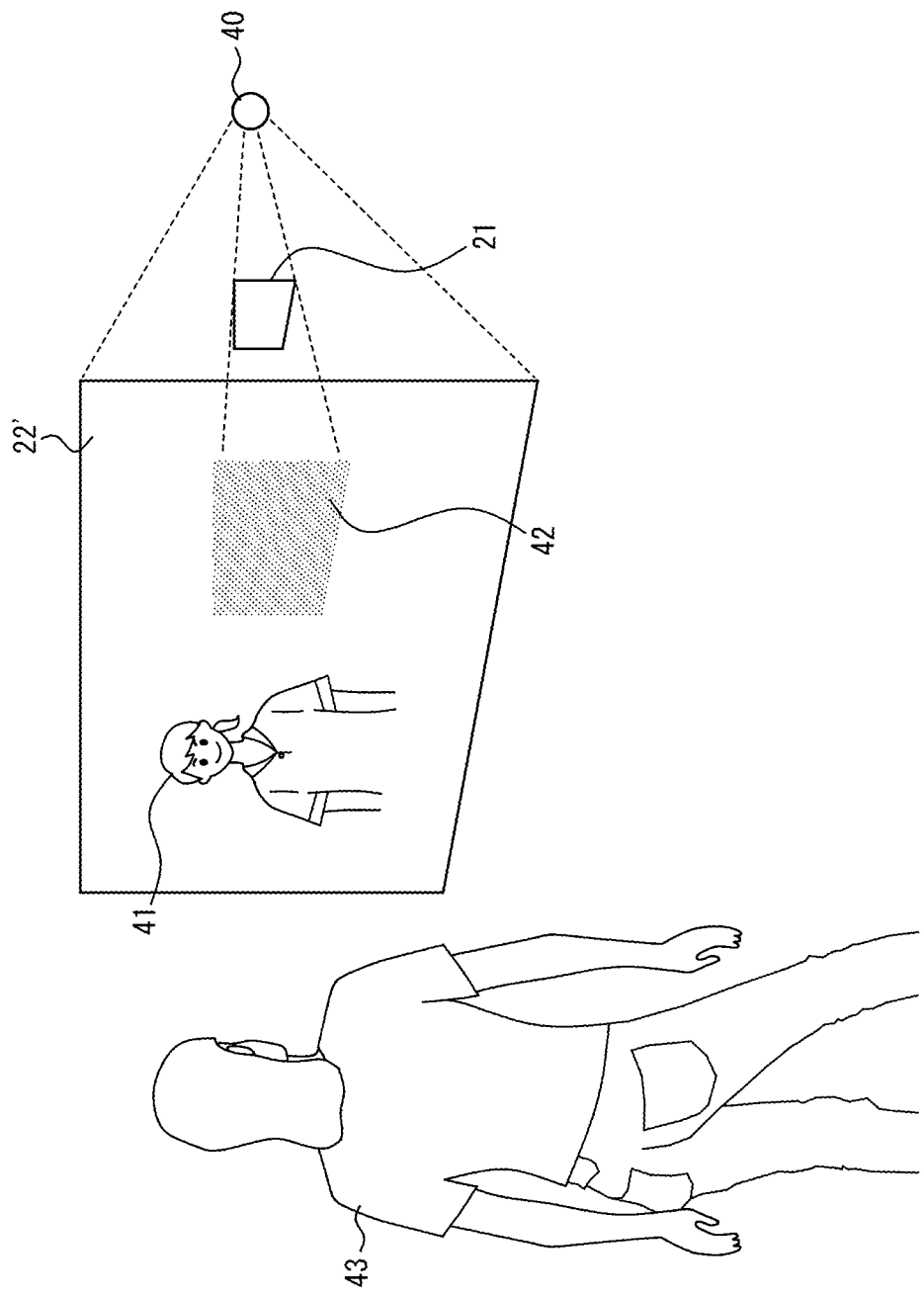

TERMINAL APPARATUS

CROSS-REFERENCE TO RELATED APPLICATION

This application claims priority to Japanese Patent Application No. 2022-212662, filed on Dec. 28, 2022, the entire contents of which are incorporated herein by reference.

TECHNICAL FIELD

The present disclosure relates to a terminal apparatus.

BACKGROUND

Methods in which users at different locations communicate via a network using computers to make a virtual face-to-face call by transmitting and receiving images and sound to and from each other are known. Various technologies have been proposed to assist such face-to-face calls over networks. For example, Patent Literature (PTL) 1 discloses technology for selecting captured images of a caller using information regarding the position and orientation of the caller relative to a screen.

CITATION LIST

Patent Literature

PTL 1: JP 2017-022600 A

SUMMARY

There is room to further improve the reality of virtual face-to-face calls.

The following description discloses a terminal apparatus or the like that enables improvement in the reality of virtual face-to-face calls.

A terminal apparatus according to the present disclosure is a terminal apparatus including:
  a display configured to be capable of displaying an image to a user in front;
  a first imager provided around the display;
  a plurality of second imagers provided behind the display;
  a communication interface; and
  a controller configured to communicate by the communication interface,
  wherein the controller is configured to transmit, to another terminal apparatus, information for generating a model image representing the user, based on a captured image by a second imager that corresponds to the position of the user included in a captured image by the first imager, so that the other terminal apparatus displays the model image.

According to a terminal apparatus or the like in the present disclosure, it is possible to improve the reality of virtual face-to-face calls.

BRIEF DESCRIPTION OF THE DRAWINGS

In the accompanying drawings:
FIG. 3A is a flowchart illustrating an example of operations of a terminal apparatus;
FIG. 4 is a diagram illustrating an example of a variation.

DETAILED DESCRIPTION

Embodiments are described below.

Figure 1:
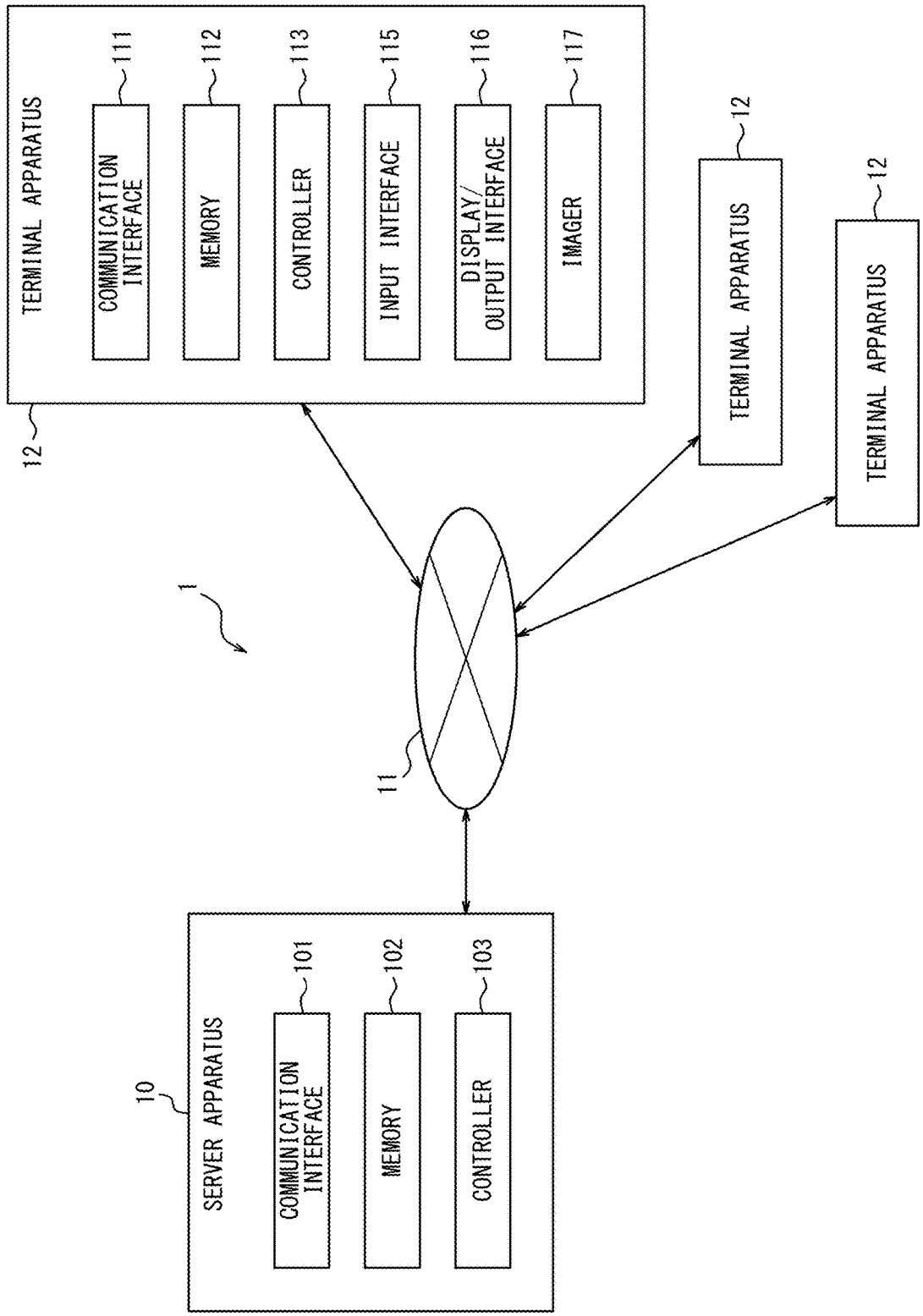
FIG. 1 is a diagram illustrating a configuration example of a call system.
Figure 2:
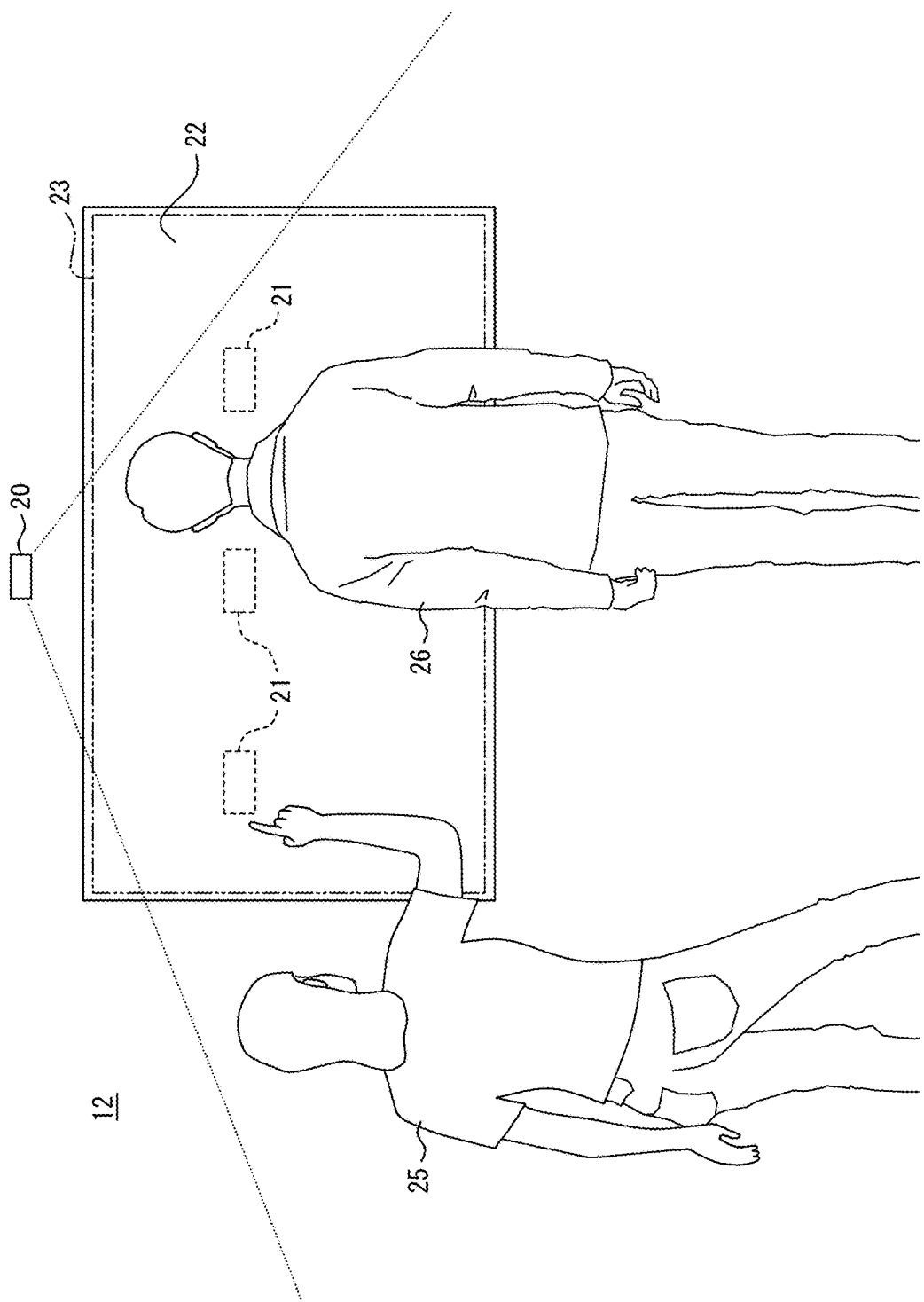
FIG. 2 is a diagram illustrating an operation example of the call system.

An example configuration of a call system 1 according to an embodiment will be described with reference to FIGS. 1 and 2. FIG. 1 illustrates an example configuration of the entire call system, and FIG. 2 illustrates an example configuration of a terminal apparatus 12 included in the call system 1.

The call system 1 includes a plurality of terminal apparatuses 12 and a server apparatus 10 that are connected via a network 11 to enable communication of information with each other. The call system 1 is a system for providing call events in a virtual space in which users can participate using the terminal apparatuses 12. In the call events in the virtual space, each user is represented by a model image that stands for the user.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 transmits and receives, and performs information processing on, information necessary to provide a call event.

Each terminal apparatus 12 is an apparatus that is capable of information processing and information communication and that is provided with image display and input functions, imaging functions, and sound input/output communication functions. The terminal apparatuses 12 are used by users who participate in a call in the virtual space provided by the server apparatus 10. The terminal apparatus 12 comprises, for example, a display device with a transparent touch display, a camera, a microphone and a speaker, and an information processing apparatus such as a personal computer with a communication interface.

As illustrated in FIG. 2, for example, the terminal apparatus 12 has a transparent display 22 capable of displaying images of a calling party for the users 25, 26, and a transparent touch panel 23 superimposed and integrated with the display 22 to enable touch input. The display 22 is, for example, a Liquid Crystal Display (LCD) or an organic Electro Luminescent (EL) display. The display 22 and touch panel 23 have a size of about 100 cm high and 150 cm wide, for example, to allow the multiple users 25 and 26 to simultaneously view and draw the images side by side. This size is an example and is not limited to the numbers here. The terminal apparatus 12 also has an overhead camera 20 that is installed around the display 22, for example at the top, to capture images of the area in front of the display 22 where the users 25 and 26 are located. The terminal apparatus 12 also has two or more arbitrary number of in-screen cameras 21, which are located, for example, a dozen to several dozen centimeters behind the display 22 and touch panel 23 and can image the area in front of the display 22 by passing through the display 22 and touch panel 23. The plurality of in-screen cameras 21 are installed, for example, at arbitrary intervals in the horizontal direction and at a height at which the upper bodies of the users 25 and 26 can be imaged, e.g., 100 cm to 150 cm from the floor or ground.

The network 11 may, for example, be the Internet or may include an ad hoc network, a local area network (LAN), a metropolitan area network (MAN), other networks, or any combination thereof.

In the present embodiment, the terminal apparatus 12 transmits information to another terminal apparatus 12 to generate model images representing the users 25 and 26 based on captured images taken by the in-screen cameras 21 corresponding to the positions of the users 25 and 26 included in a captured image taken by the overhead camera 20, for the other terminal apparatus 12 to display each model image. The model image can be switched between a 2D model or a 3D model depending on the distance of the user 25, 26 from the in-screen camera 21. Thus, even when the relatively large display 22 is used simultaneously by the multiple users 25 and 26, it is possible to identify an in-screen camera 21 closest to each of the users 25 and 26 based on the captured image by the overhead camera 20, and, by using the captured image of the in-screen camera 21, acquire information to generate the image model that more precisely represents each user. By transmitting and receiving such information between the terminal apparatuses 12, the reality of face-to-face calls in the virtual space can be improved.

Respective configurations of the server apparatus 10 and the terminal apparatuses 12 are described in detail.

The server apparatus 10 includes a communication interface 101, a memory 102, and a controller 103. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the controller 103 and information obtained by the operations of the controller 103.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Each terminal apparatus 12 includes a communication interface 111, a memory 112, a controller 113, an input interface 115, a display/output interface 116, and an imager 117. The input interface 115 includes the touch panel 23. The display/output interface 116 includes the display 22. The imager 117 includes the overhead camera 20 and the in-screen cameras 21.

The communication interface 111 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 111 and communicates information with the server apparatus 10 and the like over the network 11.

The memory 112 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 112 functions as, for example, a main memory, an auxiliary memory, or a cache memory. The memory 112 stores information to be used for the operations of the controller 113 and information obtained by the operations of the controller 113.

The controller 113 has one or more general purpose processors, such as CPUs or Micro Processing Units (MPUs), or one or more dedicated processors, such as GPUs, that are dedicated to specific processing. Alternatively, the controller 113 may have one or more dedicated circuits such as FPGAs or ASICs. The controller 113 is configured to perform overall control of the operations of the terminal apparatus 12 by operating according to the control/processing programs or operating according to operating procedures implemented in the form of circuits. The controller 113 then transmits and receives various types of information to and from the server apparatus 10 and the like via the communication interface 111 and executes the operations according to the present embodiment.

The input interface 115 includes one or more interfaces for input. The interfaces for input include the touch panel 23 that is overlaid on or integrated with the display 22, for example. In addition, the interface for input may include a physical key, a capacitive key, a pointing device, or a microphone that accepts sound input. The interface for input may further include a scanner, camera, or IC card reader that scans an image code. The input interface 115 accepts operations for inputting information to be used in the operations of the controller 113 and transmits the inputted information to the controller 113.

The display/output interface 116 includes one or more interfaces for output. The interfaces for output include, for example, the display 22. The interfaces for output include a speaker. The display/output interface 116 outputs information obtained by the operations of the controller 113.

The imager 117 includes the overhead camera 20 and the plurality of in-screen cameras 21. Each of the overhead camera 20 and the in-screen cameras 21 includes a visible light camera that captures captured images of a subject using visible light, and a distance measurement sensor that acquires distance images by measuring a distance to the subject. The visible light camera captures the subject at, for example, 15 to 30 frames per second to produce a video image formed by a series of captured images. The distance measurement sensor includes a ToF (Time Of Flight) camera, LiDAR (Light Detection And Ranging), and a stereo camera and generates distance images of the subject that contain distance information. The overhead camera 20 transmits the captured images (hereinafter referred to as overhead images) and the distance images (hereinafter referred to as overhead distance images) to the controller 113. Each of the in-screen cameras 21 transmits the captured images (hereinafter referred to as close-up images) and the distance images (hereinafter referred to as close-up distance images) to the controller 113.

The functions of the controller 113 are realized by a processor included in the controller 113 executing a control program. The control program is a program for causing the processor to function as the controller 113. Some or all of the functions of the controller 113 may be realized by a dedicated circuit included in the controller 113. The control program may be stored on a non-transitory recording/storage medium readable by the terminal apparatus 12 and be read from the medium by the terminal apparatus 12.

Figure 3B:
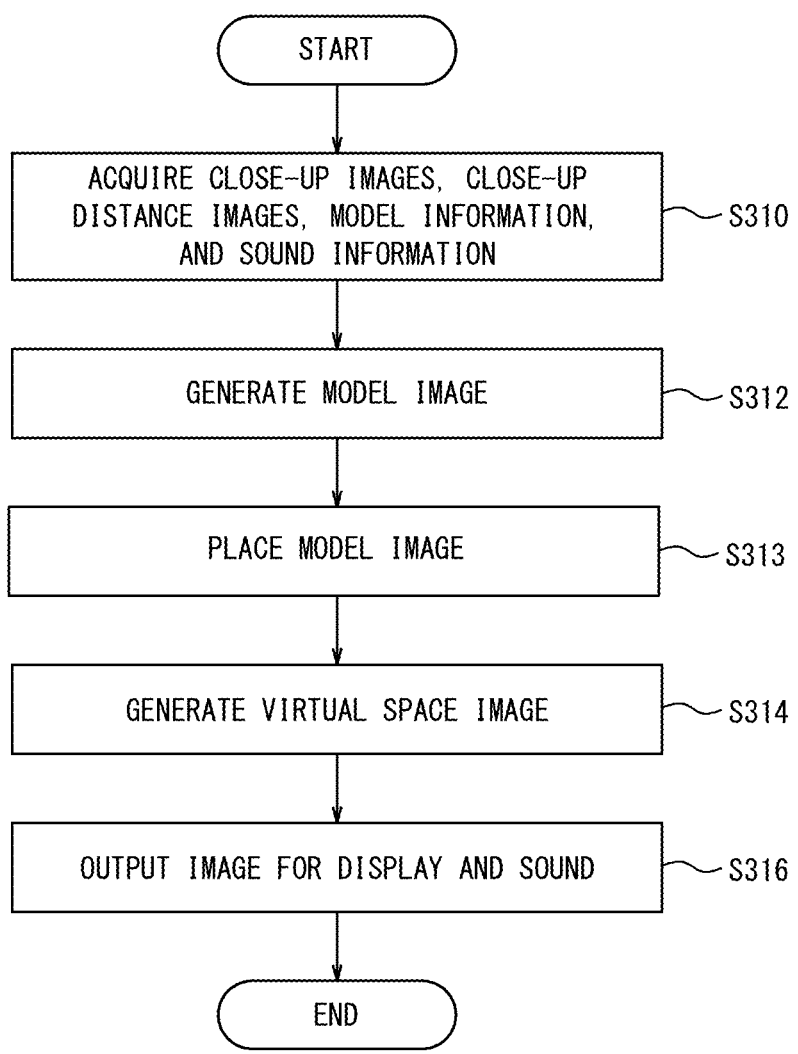
FIG. 3B is a flowchart illustrating an example of operations of the terminal apparatus.

FIGS. 3A and 3B are flowcharts illustrating the operating procedures of the terminal apparatus 12 for conducting a call event. The procedures described here are performed by the controller 113 when the multiple terminal apparatuses 12 transmit and receive information for displaying a model image and sound information for each user after establishing a mutual connection through the server apparatus 10.

FIG. 3A relates to the operating procedure of the controller 113 when each terminal apparatus 12 transmits information for generating model images of own users who use that terminal apparatus 12, and the like.

In step S300, the controller 113 controls the overhead camera 20 of the imager 117 to capture overhead images and acquire overhead distance images of the own users at an appropriately set frame rate, and controls the input interface 115 to collect sound of the own users' speech. The controller 113 acquires the overhead images and the distance images from the imager 117 and acquires sound information from the input interface 115.

In step S301, the controller 113 derives the position of each user based on the overhead images and the overhead distance images. The controller 113 detects the user from the overhead image by pattern recognition or other image processing. The controller 113 also derives the distance and direction of each detected user, for example, at the position of the center of a face, from the overhead camera 20. The center of the face may be the center of both eyes detected further within the face, or the center or center of gravity of a geometric region detected as a face. The controller 113 then derives the spatial coordinates of each user using the spatial coordinates of the overhead camera 20 that are stored in the memory 112 in advance.

In step S302, the controller 113 controls an in-screen camera 21 nearest to each user to capture close-up images and acquire close-up distance images. The controller 113 derives the in-screen camera 21 nearest to each user using the spatial coordinates of each in-screen camera 21, which are stored in the memory 112 in advance, and the spatial coordinates of each user. The controller 113 selects the in-screen camera 21 nearest to each user by, for example, deriving the distances of combinations between the center of each user's face and a lens position of each in-screen camera 21 and searching for the shortest one. The controller 113 then activates the selected in-screen camera 21 and controls the selected in-screen camera 21 to capture the close-up images and acquire the close-up distance images at an arbitrarily set frame rate. The in-screen cameras 21 that are not selected can be kept inactive to reduce power consumption.

In step S303, the controller 113 determines the type of the model image representing each user. The controller 113 determines the type of the model image as a 2D or 3D model according to the distance between each user and the nearest in-screen camera 21. The controller 113 uses arbitrary criteria stored in the memory 112 in advance to determine the 2D model when the distance between each user and the nearest in-screen camera 21 is less than the criteria, and the 3D model when the distance is greater than the criteria. The criteria is, for example, tens to hundreds of centimeters.

In step S304, the controller 113 encodes the close-up images, the close-up distance images, the model information, and the sound information to generate encoded information. The model information is information indicating the type of the model image for each user and the placement of each user. The information indicating the placement of each user is, for example, information on the position of the in-screen camera 21 that has captured the close-up images. The controller 113 may perform any appropriate processing (such as resolution change and trimming) on the captured images and the like at the time of encoding.

In step S305, the controller 113 converts the encoded information into a packet using the communication interface 111 and transmits the packet to the server apparatus 10 for the other terminal apparatus 12.

Upon acquiring inputted information that corresponds to an operation by the own users to suspend image capture and sound collection or to exit the call event (Yes in S306), the controller 113 terminates the processing procedure in FIG. 3A. While not acquiring the information that corresponds to the operation for suspension or exit (No in S306), the controller 113 executes steps S300 to S305 to transmit, to the other terminal apparatus 12, the information for generating the model images representing the own users and the information for outputting sound.

FIG. 3B relates to the operating procedure of the controller 113 when the terminal apparatus 12 outputs images and sound of other users. Upon receiving, via the server apparatus 10, a packet transmitted by the other terminal apparatus 12 performing the procedure in FIG. 3A, the controller 113 performs steps S310 to S316.

In step S310, the controller 113 decodes encoded information included in the packet received from the other terminal apparatus 12 to acquire close-up images, close-up distance images, model information, and sound information.

In step S312, the controller 113 generates model images representing the other users. The controller 113 determines whether to generate 2D models or 3D models based on the model information. The controller 113 then generates a 2D or 3D model representing each user based on the close-up images or based on the close-up images and the close-up distance images. In generating the 3D model, the controller 113 generates a polygon model using a distance image of another user and applies texture mapping to the polygon model using a captured image of the other user, thereby generating the 3D model of the other user. This example is not limiting, however, and any appropriate method can be used to generate the 3D model.

In step S313, the controller 113 places the model representing each user in the virtual space where the call event is held. The controller 113 places the generated models of the other users at coordinates in the virtual space. The controller 113 places each model at coordinates in the corresponding virtual space using information indicating model placement contained in the model information. For example, each model is placed at the position of the in-screen camera 21 corresponding to each model in the displayed image.

In step S314, the controller 113 renders and generates a virtual space image in which the models placed in the virtual space are captured from a virtual viewpoint.

In step S316, the controller 113 displays, using the display/output interface 116, an image for display while outputting sound. In other words, the controller 113 outputs information, to the display/output interface 116, for displaying the image of the virtual space in which the 2D models or 3D models are placed. The display/output interface 116 displays the image of the virtual space on the display 22 and outputs the sound.

By the controller 113 repeatedly executing steps S310 to S316, the own users can listen to the sound of speech of other users while watching a video of the virtual space images that include the 2D models or 3D models of the other users.

When a user is relatively near to the in-screen camera 21, a 2D model that captures an area nearer to the front of the user is displayed, so the terminal apparatus 12 can reduce a processing load on the controller 113. On the other hand, when the user moves away from the in-screen camera 21, the terminal apparatus 12 displays a 3D model with depth and stereoscopic effect, thereby improving the reality of virtual face-to-face calls.

FIG. 4 illustrates the configuration of the terminal apparatus 12 in variation. In the variation, instead of the transparent display 22, the terminal apparatus 12 has a projector 40 and a transmissive screen 22' that receives projected light by the projector 40. The projector 40 is installed behind the screen 22' against a user 43 in front of the screen 22'. In such a configuration, the in-screen camera 21, or the in-screen camera 21 and its peripheral structure such as wiring may interfere with the projected light by the projector 40, causing a shadow in an image 41 projected on the screen 22', which may cause discomfort to the user 43. Therefore, the controller 113 forms a mask image 42 at the position corresponding to the in-screen camera 21 in a projected image 41'. The mask image 42 is formed with lower luminance than a surrounding image and with a smaller difference from the shadow. This configuration can reduce the sense of discomfort. The controller 113 generates the number of mask images 42 corresponding to the number of the in-screen cameras 21, so that each of the mask images 42 corresponds to each of the in-screen cameras 21. Furthermore, the controller 113 may store the position where the mask image 42 is generated in the memory 112, and accept drawing operations to locations other than the mask image 42, but not to the position of the mask image 42.

In a further variation, the terminal apparatus 12 may be configured to use an opaque screen, such as a whiteboard, instead of the transmissive screen 22', and a projector behind the user 43 to project images onto the screen. In such a case, a hole may be provided at a position corresponding to the in-screen camera 21 on the screen, and the in-screen camera 21 may be configured to capture images of the user 43 through the hole.

The step for generating the model images from the close-up images may be distributed between steps in FIG. 3A and FIG. 3B, as appropriate. For example, a step in which the controller 113 generates the model images of the own users may be inserted between steps S303 and S304 in FIG. 3A, and the data of the generated model images may be encoded and transmitted together with the information for model placement and the sound information. In a case in which such encoded information is received from the other terminal apparatus 12, the controller 113 can decode the data of the model images and place the model images in the virtual space according to the information for placement.

In the above embodiment, the processing and control program that defines the operations by the controller 113 of the terminal apparatus 12 may be stored in the server apparatus 10 or in a memory of another server apparatus and downloaded to each terminal apparatus 12 via the network 11. The processing and control program may also be stored in a recording and storage medium that is readable by each terminal apparatus 12, and each terminal apparatus 12 may read the program from the medium.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus comprising:
a display configured to be capable of displaying an image to a user in front;
a first imager provided around the display;
a plurality of second imagers provided behind the display;
a communication interface; and
a controller configured to communicate by the communication interface, wherein the controller is configured to transmit, to another terminal apparatus, information for generating a model image representing the user, based on a captured image by a second imager that corresponds to a position of the user included in a captured image by the first imager, so that the other terminal apparatus displays the model image; and wherein the display is a screen that is configured to display a projected image from a projector located behind the plurality of second imagers, and the controller is configured to control the projector to project mask images at positions at which shadows of the plurality of second imagers interfere in the projected image.

2. The terminal apparatus according to claim 1, wherein the model image representing the user is a 2D model when the user is located at a first distance from the display, and is a 3D model when the user is located at a second distance greater than the first distance.

3. The terminal apparatus according to claim 1, wherein the controller is configured to make luminance of the mask images lower than luminance of images surrounding the mask images in the projected image.

4. The terminal apparatus according to claim 1, wherein the controller is configured to: detect, as the position of the user, a face of the user included in the captured image by the first imager; control the second imager that corresponds to the position of the user to image the user; and control other second imagers to stop imaging the user.

* * * * *